Jan. 6, 1970   L. D. MICHEL   3,487,912
URINE CULTURE KIT
Filed April 29, 1968
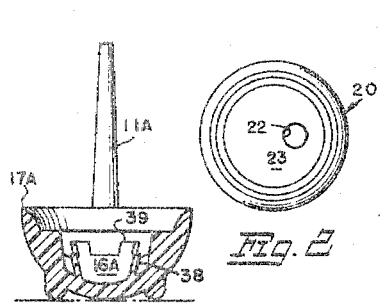
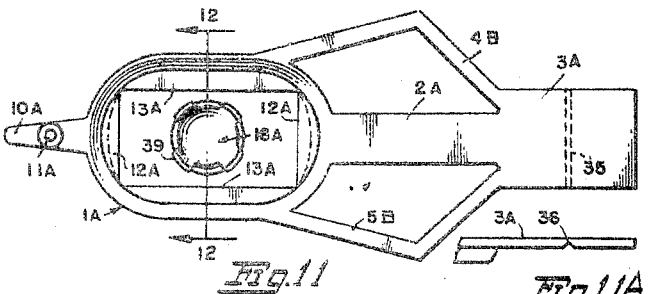
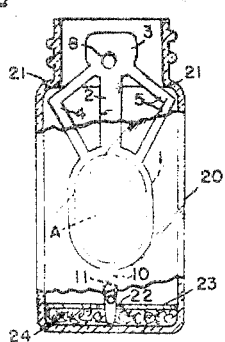
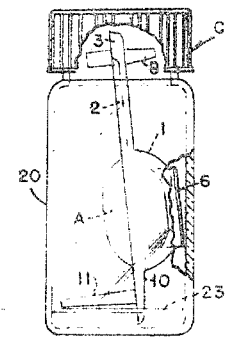
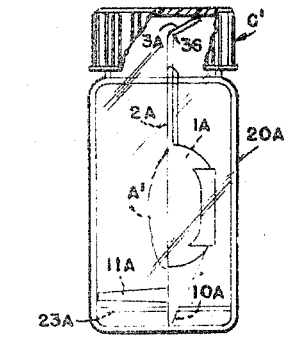
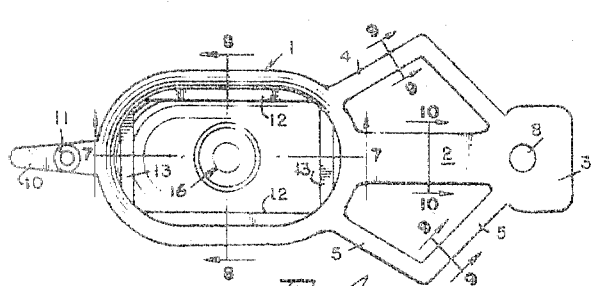
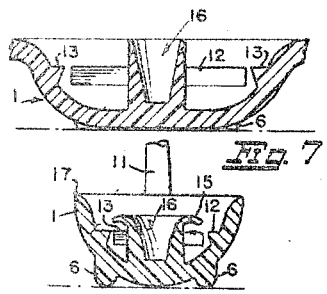
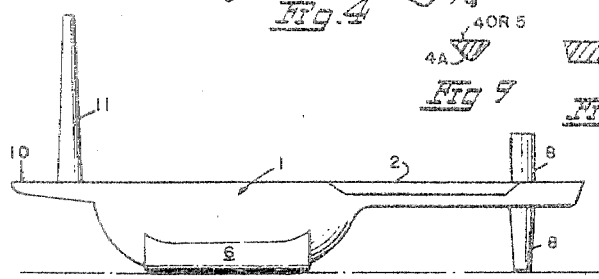
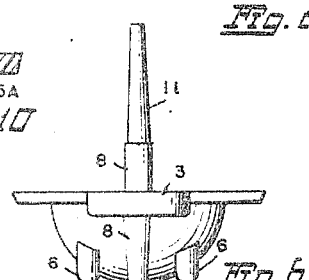
LEWIS DAVIS MICHEL
INVENTOR.
BY James D. Girman
ATT'Y

United States Patent Office 3,487,912
Patented Jan. 6, 1970

3,487,912
URINE CULTURE KIT
Lewis Davis Michel, Portland, Oreg., assignor to United Medical Laboratories, Inc., Portland, Oreg., a corporation of Oregon
Filed Apr. 29, 1968, Ser. No. 724,700
Int. Cl. A45c 11/02
U.S. Cl. 206—1    6 Claims

ABSTRACT OF THE DISCLOSURE

A device for preserving and protecting microorganisms, as obtained from original specimen, during transit from their source to medical laboratories for testing and analogous purposes.

---

More particularly, though not restrictively, the embodiment of the invention herein shown and described is that of a device adapted for use as a urine culture kit including a unitary holder for culture medium, such as agar or the like, to be dipped into a properly collected urine specimen so that any organisms present would cling to the agar and maintain their viability while in transit and during laboratory identification. Transportation of the unitary holder to be by means of a sterile, stoppered container.

The principal object of the invention is to provide a holder of the character described preferably, though not restrictively, made entirely of medium density polyethylene and including means at its sides, top and bottom ends to prevent the culture medium, in handling or transportation, from contact with the walls of a sterile carrier or container in the form of a stoppered bottle or the like having an internal annular shoulder.

The foregoing and other objects and advantages which will become subsequently apparent reside in the details of construction and operation as more fully hereinafter described and claimed, reference being had to the accompanying drawing forming a part hereof and in which:

FIGURE 1 is an elevational view of a carrier, with fragments broken away, showing the culture medium holder fixedly held within the carrier.

FIGURE 2 is a top view of FIGURE 1 with the culture medium holder removed.

FIGURE 3 is a view similar to FIGURE 1 rotated through 90 degrees with a screw cap attached to the carrier and showing the fixedly held disposition of the holder in relation to the inner walls of the carrier.

FIGURE 4 is a top plan view of the unitary holder on an enlarged scale.

FIGURE 5 is a side elevational view of FIGURE 4.

FIGURE 6 is a view of the right hand end of FIGURE 5.

FIGURES 7, 8, 9 and 10 are sectional views taken respectively along the lines 7—7, 8—8, 9—9 and 10—10 of FIGURE 4.

FIGURE 11 is a view similar to FIGURE 4 of a modified form of the invention.

FIGURE 11A is a fragmentary side elevational view of FIGURE 11.

FIGURE 12 is a sectional elevational view taken along the line 12—12 of FIGURE 11.

FIGURE 13 is a view similar to FIGURE 3.

With continuing reference to the drawing wherein like reference numerals designate like parts and particularly FIGURES 4–10 thereof, numeral 1 indicates generally the main body of the holder in the form of a bowl molded integral with a handle 2 terminating at its outer end in a finger grip 3 and reinforced by laterally extending and somewhat flexible angular trusses 4 and 5 reinforced by stiffening ribs 4A and 5A.

Molded integral with the external side walls of the bowl 1 are parallel leg members 6 cooperating with a pin 8 extending through and downwardly from the finger grip 3 in supporting the bowl for filling or other operations. The pin 8 extends upwardly from the finger grip 3 as shown.

The opposite end of the bowl 1 is molded integrally with a stem 10 and a vertically disposed pin 11 in alignment with the pin 8.

The interior of the bowl 1 is provided with inwardly extending longitudinal and transverse shoulders 12 and 13 for cooperation with the outwardly and downwardly bent circumferential rim portion 17 of an internal cup 16 centrally disposed within the bowl 1 and cooperating with the shoulders 12–13, for holding the culture medium A within the bowl.

With the culture medium so held within the bowl by the shoulders 12–13, the internal cup 16 and by surface tension about the sharp rim portions 17 of the bowl, the holder is inserted into the carrier 20 and fixedly held by the snap-in engagement of the trusses 4 and 5 adjacent the annular shoulder 21 of the carrier with the stem 10 of the bowl extending through an opening 22 in a disk of cardboard 23, or other suitable material, overlying a layer of cotton 24, or the like, in the bottom of the carrier, with the pin 11 resting upon the top of the disk and the leg members 6 bearing against the side wall of the carrier. The holder is thus held in a fixed position within the carrier by the points of contact just described.

The layer of cotton 24 may be dispensed with when the inherent moisture of the culture medium held within the bowl 1 is sufficient to provide the interior of the carrier, when sealed by the screw cap C, with the humidity necessary for cultivating the specimen carried by the culture medium.

In the modified form of the invention shown in FIGURES 11–13 the bowl 1A, shoulders 12A–13A, stem 10A, pin 11A and handle 2A are substantially identical with their counterparts shown in the first form. The angular trusses 4B–5B are also similar but narrower and thinner than those shown in the first form and terminate at their outer ends along with the handle 2A in an enlongated finger grip 3A scored on its underside as at 35 to provide a transverse fold line 36 to render the finger grip flexible, as shown in FIGURE 13, under downward pressure of the screw cap C' when attached to the carrier 20A. This downward pressure of the screw cap is relied upon for maintaining the unit firmly stabilized within the carrier by the bottom end of stem 10A in contact with the bottom wall of the carrier and the outer end of the pin 11 in contact with the inner side wall of the carrier.

The side walls of the internal cup 16A, in contrast to its counterpart shown in FIGURES 7 and 8, has upwardly diverging side walls 38 terminating in what might be termed a castellated top rim 39, all of which cooperate with the shoulders 12A–13A and the surface tension at 17A in holding the culture medium A' within the bowl 1A.

What I claim is:

1. A urine culture kit comprising a unitary holder for a culture medium and a cylindrical carrier for transporting the holder,
    said carrier having a bottom end and reduced in diameter at its opposite open end thereby providing an internal annular shoulder,
    a closure cap for said open end of the carrier,
    said holder comprising a bowl,
    culture medium holding means formed integral with the interior of the bowl,
    means extending from opposite ends of said bowl engageable respectively with said annular shoulder and with the bottom end of the carrier for stabilizing the bowl and its contents against movement within the carrier and the bowl contents out of contact with the inner surface of the carrier.

2. A urine culture kit as claimed in claim 1 wherein said bowl is elongated and includes inwardly extending shoulder portions along its side walls and across its end walls.

3. A urine culture kit as claimed in claim 2 wherein said culture medium holding means includes a cup member mold-united with one wall of said bowl on the interior thereof centrally of said shoulder members and cooperating therewith in holding said culture medium within the bowl.

4. A urine culture kit as claimed in claim 1 wherein said means extending from opposite ends of said bowl comprises a handle extending from one end of the bowl terminating in a finger grip and having laterally disposed truss members interconnecting said one end of the bowl and said finger grip, and a stem extending outwardly from the opposite end of said bowl in alignment with said handle and engageable with said bottom end of the carrier.

5. A urine culture kit as claimed in claim 4 including a moisture absorbing disk superjacent said bottom end of the carrier and having an opening therethrough, and said stem extending through said opening in said disk and engageable with said bottom end of the carrier.

6. A urine culture kit as claimed in claim 4 including a closure cap for said diametrically reduced end of the carrier, the over-all length of said bowl, handle and stem being greater than the internal depth of said carrier whereby compression loading of said holder throughout its length by applying the closure cap to the carrier will stabilize the extension of said stem through the opening in said disk.

References Cited
UNITED STATES PATENTS

| | | | |
|---|---|---|---|
| 2,618,563 | 11/1952 | Barnhard | 220—17 |
| 2,835,246 | 5/1958 | Boettger | 220—17 |
| 2,880,856 | 4/1959 | Albrecht | 206—1 |
| 3,343,657 | 9/1967 | Speshyock | 206—5 |

WILLIAM T. DIXSON, Jr., Primary Examiner

U.S. Cl. X.R.
195—139; 220—17